United States Patent [19]
Tanaka et al.

[11] 4,224,918
[45] Sep. 30, 1980

[54] CYLINDER HEAD CONSTRUCTION

[75] Inventors: Kazuyuki Tanaka; Kazuo Kobayashi; Itsuro Okabe, all of Hiroshima; Toshimitsu Tanaka, Yamaguchi, all of Japan

[73] Assignee: Toyo Kogyo Co., Ltd., Hiroshima, Japan

[21] Appl. No.: 5,012

[22] Filed: Jan. 19, 1979

Related U.S. Application Data

[63] Continuation of Ser. No. 789,277, Apr. 20, 1977, abandoned.

[30] Foreign Application Priority Data

Apr. 24, 1976 [JP] Japan .................................. 51-51612
May 6, 1976 [JP] Japan .................................. 51-57112
May 6, 1976 [JP] Japan .................................. 51-57113
May 14, 1976 [JP] Japan .................................. 51-55920
May 14, 1976 [JP] Japan .................................. 51-62107

[51] Int. Cl.³ .......................... F02B 23/08; F02F 1/42
[52] U.S. Cl. .................................. 123/657; 123/188 M
[58] Field of Search ............. 123/32 C, 32 SP, 188 R, 123/188 S, 188 M, 191 M, 191 S, 193 R, 193 CH, 193 CP, 193 H

[56] References Cited

U.S. PATENT DOCUMENTS 2,472,117  6/1949  McGowen ....................... 123/191 M
2,622,579 12/1952  Weslake ......................... 123/191 M
2,737,170  3/1956  McDuffie ........................ 123/191 M
2,800,123  7/1957  Fisher ............................. 123/191 M
3,192,912  7/1965  Stumpfig ......................... 123/191 S
3,766,900 10/1973  Aiti ................................. 123/191 M

FOREIGN PATENT DOCUMENTS 2359058  8/1974  Fed. Rep. of Germany ...... 123/193 M
604997   7/1948  United Kingdom ................ 123/191 M
640734   7/1950  United Kingdom ................ 123/191 M Primary Examiner—Charles J. Myhre
Assistant Examiner—Craig R. Feinberg
Attorney, Agent, or Firm—Wenderoth, Lind & Ponack

[57] ABSTRACT

Cylinder head construction defining a hemispheric combustion chamber which includes a guide wall provided to impart swirl to the incoming air-fuel mixture. The guide wall facing the intake port defined by the cylinder head construction and generally parallel to the line of action of an intake valve provided in the intake port has a height greater than the maximum lift of the intake valve, and decreases in width in the direction of opening of the intake valve. In addition, the size of the area and the position of the guide wall relative to the intake port and the intake valve are maintained in specific ranges, and thus the construction not only permits efficient ignition of a lean air-fuel mixture, but at the same time causes only a slight drop in engine performance.

4 Claims, 10 Drawing Figures

CYLINDER HEAD CONSTRUCTION

This application is a continuation of application Ser. No. 789,277, filed Apr. 20, 1977, now abandoned.

The present invention relates to an improved cylinder head construction for an internal combustion engine.

In an endeavor to reduce atmospheric pollution due to exhaust gas of internal combustion engines, there have recently been proposed various types of engines of the socalled lean combustion mixture type in which the air-fuel ratio in the mixture employed in the combustion process is comparatively high. However, making the air-fuel ratio high brings the mixture close to the limit of inflammability on the lean side, and problems of misfiring or knocking are particularly severe in lean mixture engines, in addition to which these engines are noted for low economy and decreased performance.

It is accordingly a principal object of the invention to provide an improved reciprocating engine cylinder head construction which permits a lean combustion mixture to be employed, but avoids problems of knocking and ignition failure.

It is another object of the invention to provide a cylinder head construction of the above described type which permits efficient engine performance to be maintained despite the use of a lean combustion mixture.

It is a further object of the present invention to provide a cylinder head construction of the above described type which has a simple structure and can readily be incorporated into internal combustion engines at low cost.

It is a still further object of the present invention to provide a cylinder head construction which defines a hemispheric combustion chamber. When a combustion chamber having this shape is employed, it is possible to locate the spark plug so that once combustion of a fuel-air mixture has started, the flame front has a relatively short distance to travel to burn all parts of the mixture, and there are no remote pockets of gas liable to detonate and cause knocking. To ensure that combustion of the air-fuel mixture may proceed rapidly and completely even when a lean mixture is employed, the invention therefore provides a guide wall which is located near the air intake port and causes the air-fuel mixture to swirl in the combustion chamber, whereby there is produced a suitable degree of turbulence in the air-fuel charge. Further, since it is known that such a guide wall can have an adverse effect on volumetric efficiency, the inventors undertook research on the optimum dimensions of the guide wall and the distance thereof from and attitude thereof with respect to the intake port, and this research made it possible to achieve a guide wall which causes effective swirling of an air-fuel mixture without having an adverse effect on the engine performance.

A better understanding of the present invention may be had from the following full description of several preferred embodiments thereof when read in reference to the attached drawings, in which like numbers refer to like parts, and in which FIG. 1 is a schematic top plan view of a cylinder head according to one preferred embodiment of the invention;

Figure 1:
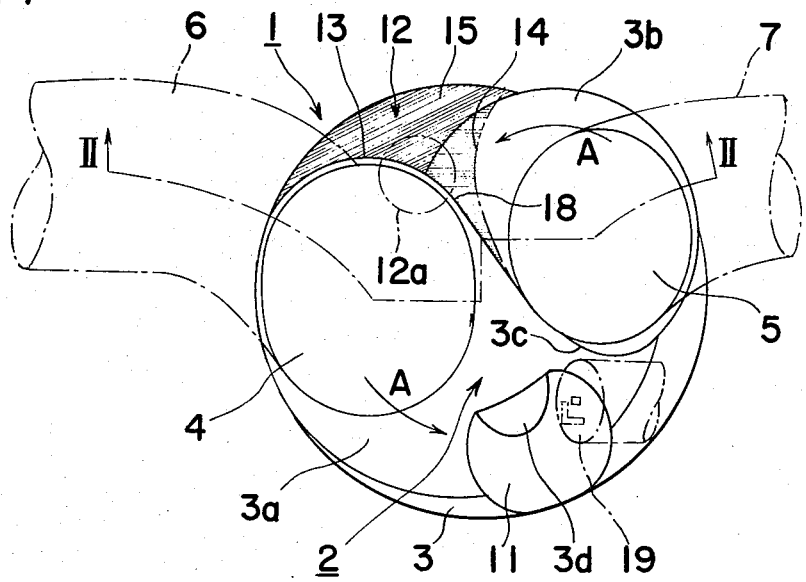
Figure 2:
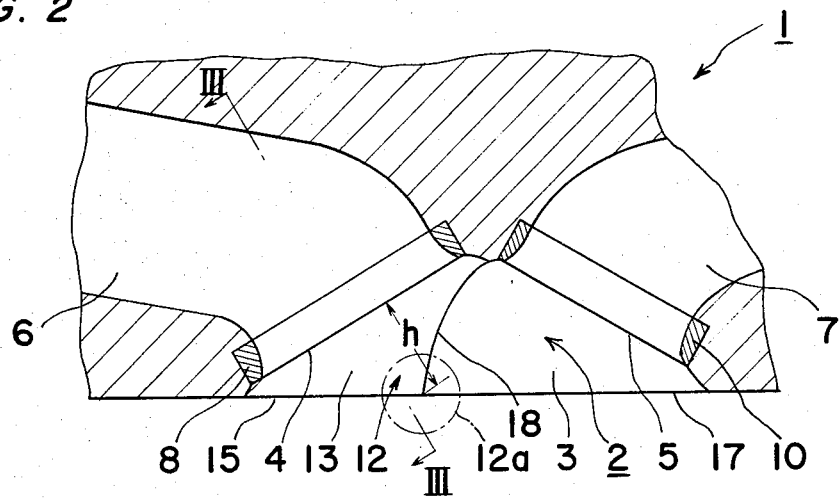
FIG. 2 is a sectional view taken along the line II—II of FIG. 1.
Figure 3:
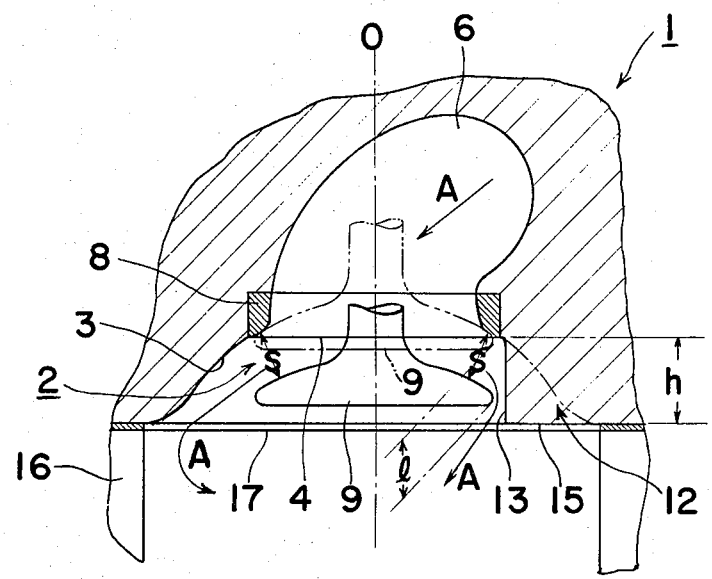
FIG. 3 is a sectional view taken along the line III—III of FIG. 2.

Referring initially to FIGS. 1, 2 and 3, there is shown a cylinder head 1 the inner wall 3 of which has a generally hemispheric wall portion 3a and a generally hemispheric wall portion 3b having a radius of curvature smaller than that of the wall portion 3a, wall portions 3a and 3b together defining a so-called multi-hemispheric combustion chamber 2. A mixture of fuel and air constituting a combustion charge is introduced into the combustion chamber 2 via an intake port 4, which is provided in the large-radius wall portion 3a which is connected by a line 6 to a carburetor or similar means. It should be noted that the carburetor may be replaced by any other type of fuel supply device which can provide an air-fuel mixture in the line 6, for example, a fuel injection device connected to the line 6. The intake port 4 is normally closed by a valve 9 (FIG. 3) which is normally seated on a valve seat 8 fitted in the intake port 4 and which is moved in a known manner away from the valve seat 8 to open the intake port 4. Waste gases produced as a result of combustion of a charge in the combustion chamber 2 leave the combustion chamber 2 via an exhaust port 5 formed in the small-radius wall portion 3b and connected to an exhaust gas line 7. An exhaust valve, not shown, is normally seated on a valve seat 10 which is fitted in the exhaust port 5, and is actuated in a known manner to open or close the exhaust port 5 at requisite times.

A charge introduced into the combustion chamber 2 is compressed by piston means (not shown) and is ignited by a spark plug 19 which is provided in a recessed portion 11 defined by the cylinder head inner wall 3. In terms of flow of the air-fuel mixture supplied through the combustion chamber 2, the recessed portion 11 is intermediate the intake port 4 and the exhaust port 5, and, in a top plan view, the intake port 4, the exhaust port 5, and the recessed portion 11 are disposed in a generally triangular arrangement. To ensure that the charge will sweep efficiently over the entire surface of the recessed portion 11 to avoid reduction of swirl imparted to the charge in a manner described below, and at the same time to avoid setting up excessive turbulence which would hinder the ignition process, the recessed portion 11 has a hemispherical surface having a diameter on the order of from 15 mm to 20 mm, and the spark plug 19 is completely accommodated in the recessed portion 11 and does not project beyond the inner wall 3 of the cylinder head 1. A flat surface 3d is provided in the recessed portion 11 and constitutes a reference surface for determination of the effective depth of the combustion chamber 2. The edge portion of the recessed portion 11 is in a smooth continuation of the large-radius wall portion 3a.

As shown most clearly by the hatched line portion of FIG. 1, between the intake port 4 and the exhaust port 5 and in terms of the approximate triangle defined by the intake port 4, the exhaust port 5, and the recessed portion 11, there is provided a guide wall or a shroud wall 12 in a position opposite to the recessed portion 11.

In FIGS. 1, 2, and 3, the guide wall 12 has three main wall surfaces and is generally triangular in cross-section. The side wall surface 13 of the guide wall 12 faces the intake port 4. In FIG. 1, the side wall surface 13 comprises a curved portion which is generally parallel to the portion of the periphery of the intake port 4 which is approximately opposite to the portion of the intake port 4 which faces the recessed portion 11. As seen in FIGS. 1 and 3, the plane of the main portion of the side wall portion 13 is generally cylindrical around the central axis 0 of the intake port 4, the axis 0 being the line along which the valve 9 moves during actuation thereof to open or close the intake port 4.

In FIG. 1, a side wall surface 14 of the guide wall 12 which is a smooth continuation of the small-radius wall portion 3b of the combustion chamber 2 faces the exhaust port 5, and has a curvature substantially equal to that of the small radius wall portion 3b.

In FIGS. 1 and 3, the lower wall surface 15 of the guide wall 12 is almost at the level of the mating surface 17 of the cylinder head 1 with a cylinder block 16, and determines the height h of the guide wall 12. Preferred values of the height h and other dimensions of the guide wall 12 are described in greater detail later.

In FIGS. 1 and 2, the junction 18 of the side wall surfaces 13 and 14 of the guide wall 12 is a smooth continuation of the line of junction 3c of the hemispheric wall portions 3a and 3b of the combustion chamber 2.

In FIG. 1, with this construction, when the valve 9 opens, the air-fuel mixture enters the combustion chamber 2 via the intake port 4, impinges on the guide wall 12, and also follows the curve of the large-radius hemispheric wall portion 3a, as indicated by the arrows A in the drawing, the opposed relationship of the guide wall 12 and the combustion chamber wall portion 3a resulting in swirl being imparted to this flow of the air-fuel mixture. This swirl is increased as the mixture enters the portion of the combustion chamber defined by the wall portion 3b, since the radius of curvature of the wall portion 3b is smaller than that of the wall portion 3a. The air-fuel mixture swirls along the cylinder head inner wall 3 and combustion proceeds efficiently, even for a lean mixture, upon energizing of the spark plug 19 to ignite the mixture.

The swirl of the air-fuel mixture in the combustion chamber may of course be enhanced by making the intake port 4 a directional port, which directs the air-fuel mixture along the periphery of the combustion chamber 2 towards the recessed portion 11.

Needless to say, as well as producing the required swirl of the air-fuel mixture in the combustion chamber, the provision of a guide wall adjacent to the intake port has certain adverse effects, such as reduction of effective valve area, for example, and therefore the cylinder head construction, similarly to the construction of other portions of an internal combustion engine, must be such that an optimum compromise of different factors is achieved. Research undertaken by the inventors was therefore directed to achieving an optimum compromise of swirl strength and other factors affecting the combustion process.

First there was considered the relationship between the lean limit of inflammability of the air-fuel mixture and the swirl strength, or velocity, of the air-fuel mixture in the combustion chamber. Swirl strength was determined by means of swirl meters located in the combustion chamber and fitted with vane elements the speed of rotation of which were taken as indicative of swirl strength.

Figure 4:
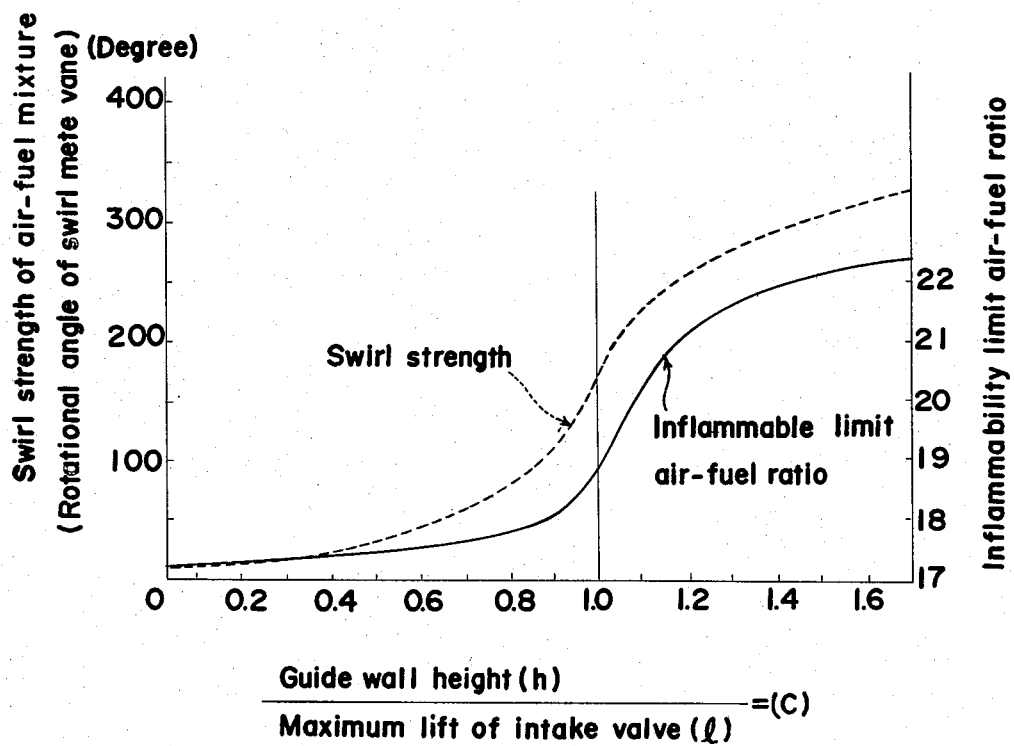
FIG. 4 is a graph plotting the relationship of swirl strength of an air-fuel mixture in a combustion chamber and of the inflammability limit air-fuel ratio to the ratio of the height of a guide wall to the maximum lift of an intake valve.

As shown in the graph of FIG. 4, the lean limit of inflammability of the air-fuel mixture in a combustion chamber provided with a guide wall such as described above is very dependent on the relation between the height h of the guide wall and the maximum lift l of the intake valve. From the graph of FIG. 4, it is seen that when the ratio $c = h/l$ is less than 1, i.e., when the height h of the guide wall is less than the maximum lift l of the intake valve, the lean limit of the air-fuel mixture is low, that is, the mixture must contain a comparatively high proportion of fuel if ignition thereof is to be ensured, which is contrary to the abovenoted requirement for reduction of atmospheric pollution. For values of the ratio c higher than 1, however, both swirl strength and the lean limit of the air-fuel mixture rise rapidly, that is, ignition even of lean mixtures can be achieved. The reason for the drop in values of swirl strength and lean limit for values of the ratio c less than 1 is that there occurs a certain amount of back-swirling which decreases the strength of swirl in the required direction leading towards the location of the spark plug. It is concluded, therefore, that the height h of the guide wall 12, should be greater than the maximum lift l of the intake valve 9, or the maximum lift l should smaller than at least the portion 12a of the guide wall 12, which is the most important portion with respect to imparting swirl and which, as indicated by the chain-dot line portions of FIGS. 1 and 2, is centered on a point of the guide wall 12 which lies on a line which is generally normal to the initial line of swirl imparted to the incoming air-fuel mixture by the wall 12.

Figure 5:
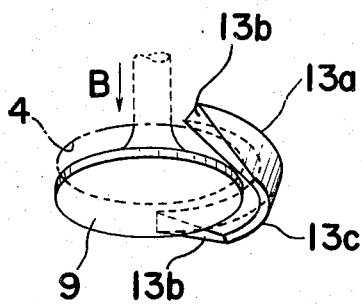
FIG. 5 is a perspective view partially in sectio showing a guide wall according to the invention.
Figure 6:
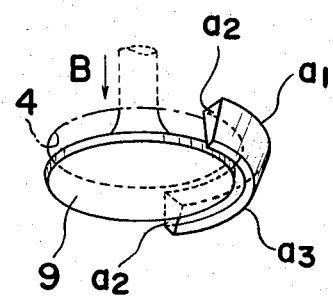
FIG. 6 is a view similar to FIG. 5, but showing a conventional guide wall.

Next there was considered the effect of reduction of effective flow area of the intake port 4 by provision of the guide wall 12. For a comparatively low lift of the intake valve 9, this reduction of flow area is normally considered to be more than off-set by the advantages achieved by the swirl. For a high lift of the intake valve 9, this reduction of valve flow area may have a considerable influence on engine performance. This problem is overcome according to the invention by provision of the guide wall 12 in which at least the wall surface 13, i.e., the circumferential dimension of the wall surface which faces the intake port 4 and is the most important portion with respect to the incoming air-fuel mixture, becomes smaller in the direction parallel to the line of action of the intake valve 9 in the valve opening direction. This is illustrated in FIG. 5, and which shows only the wall surface 13 of the guide wall 12. In the drawing, the upper edge 13a of the wall surface 13 adjoins the wall portion 3a, and the lower edge 13c is the free lower edge of the wall surface 13, and the wall surface end edges 13b join opposite ends of the upper edge 13a and lower edge 13c. The lower edge 13c of the wall surface 13 is shorter than the upper edge 13a thereof, whereby, since the plane of the wall surface 13 is generally parallel to the line of action B of the valve 9, as noted earlier, as the degree of lift of the valve 9 increases there is proportionally less reduction of effective flow area due to presence of the thus shaped guide wall 12. This construction is in contrast to a conventional construction such as shown in FIG. 6 in which the upper edge $a_1$ and the lower edge $a_3$ of a guide wall are joined by the end edges $a_2$ and are generally equal in length. Cylinder heads provided with guide walls according to the invention, such as shown in FIG. 5, and conventional guide walls, such as shown in FIG. 6, were employed in a series of tests to determine the relationship between intake valve lift, rate of flow of the incoming air-fuel mixture, and swirl strength of the air-fuel mixture flow in each cylinder head, the results of the tests being plotted in FIG. 7, in which the dashed lines and solid lines indicate values rel ting to conventional means and the means of the invention respectively. The guide walls according to the invention and the conventional guide walls employed in the tests had the same overall area, the edges $a_1$ and $a_3$ of the conventional means being shorter than the upper edge 13a and longer than the lower edge 13c of the means of the invention, in order that the overall swirl effect achievable by the different guide walls was approximately equivalent. As is seen from FIG. 7, for moderate values of valve lift, i.e., up to about 3 mm or 4 mm, rates of airfuel mixture flow are almost the same for both types of the cylinder heads, and increase in more or less straight-line proportion to increased valve lift, while the degree of swirl is similar for both means, although the degree of swirl achieved by the means of the invention is somewhat larger for very low values of valve lift, as is to be expected, since for low values of valve lift the distance between the valve head and the intake port is in line with only the widest portion of the wall surface 13.

As the valve lift increases from very low values, the swirl strength achieved by the means of the invention commences to decrease, although still remaining higher than that achieved by conventional means, and the value of the swirl strength achieved by conventional means becomes steady, until the valve lift becomes approximately 5 mm. For values of valve lift above about 5 mm, swirl strength achieved by the means of the invention becomes lower than that achieved by conventional means, and for both means, the swirl strength decreases with increasing valve lift, due to the increased rate of air-fuel mixture flow. For values of valve lift over about 4 mm, however, in conventional means there is a marked decrease in the rate of air-fuel mixture intake with increased valve lift. In contrast, with the means of the invention, the air-fuel mixture intake curve continues to climb steeply with increased valve lift, with the result that for a valve lift of about 9 mm, when rate of air-fuel mixture intake for both means becomes steady, the air-fuel mixture intake permitted by the means of the invention is more than 1.5 $m^3$/min greater than that achieved with the conventional means. In other words, the invention offers the advantage that swirl may be imparted to the air-fuel mixture entering a combustion chamber but at the same time there is minimum lowering of engine performance due to reduction of intake valve flow area.

Figure 7:
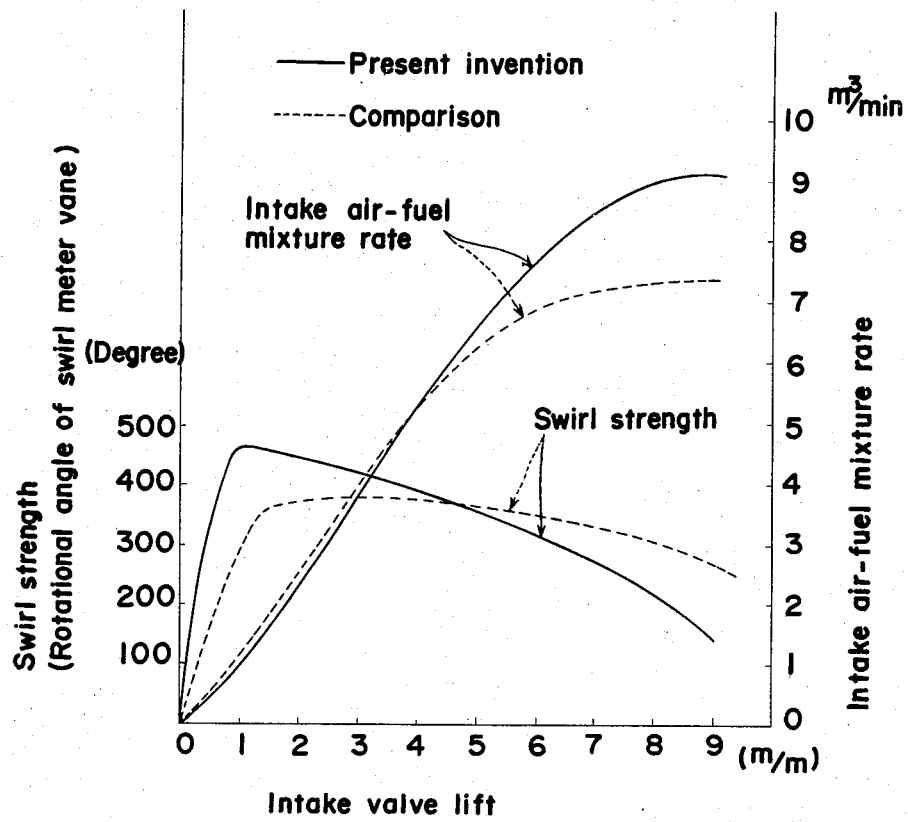
FIG. 7 is a graph comparing the swirl strength achieved and the rate of air-fuel mixture intake permitted by the use of a guide wall according to the invention and by the use of a conventional guide wall.

Needless to say, the solid-line curves in the graph of FIG. 7 may be altered by altering the overall area of the guide wall 12 and/or by varying the relative length of the upper edge 13a and the lower edge 13c of the wall surface 13.

Figure 8:
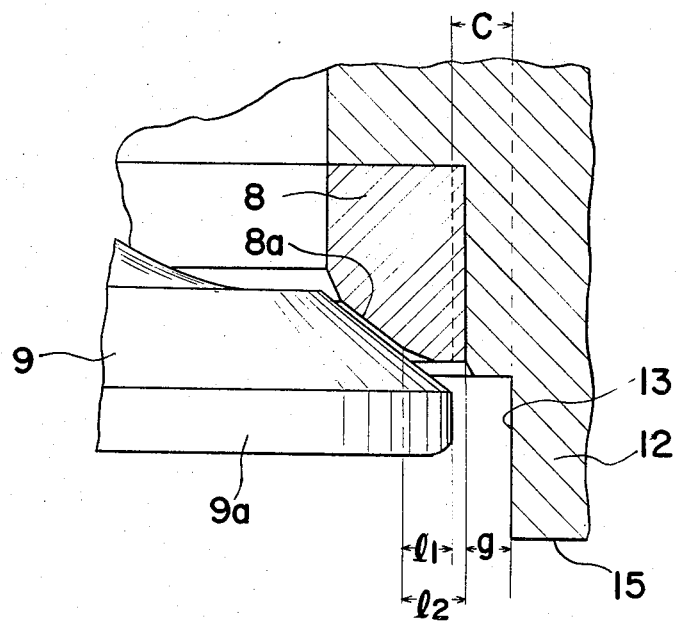
FIG. 8 is a detail side view, partially in section illustrating a prefer red distance of the guide wall from portions of the intake valve and the intake port in a cylinder head according to the invention.

Referring now to FIG. 8, the clearance c between the wall surface 13 of the guide wall 12 and the outer periphery of the head 9a of the intake valve 9 has a considerable influence on the degree to which the swirl can be imparted to the incoming air-fuel mixture, on engine performance, on the deposit of unburned components on the intake valve 9 or the guide wall 12, resulting in reduced engine performance or incorrect seating of the valve 9, and, if the valve seat 8 is an insert, on the ease of mounting or replacement of the valve seat 8. From the point of view of engine performance, ease of mounting the valve seat 8, and avoidance of deposits on the valve 9 or the guide wall 12, the larger the clearance c the better. However, in order to make it possible to impart sufficient swirl to the incoming air-fuel mixture to permit use of a lean air-fuel mixture, the clearance c must be kept within certain limits.

Figure 9:
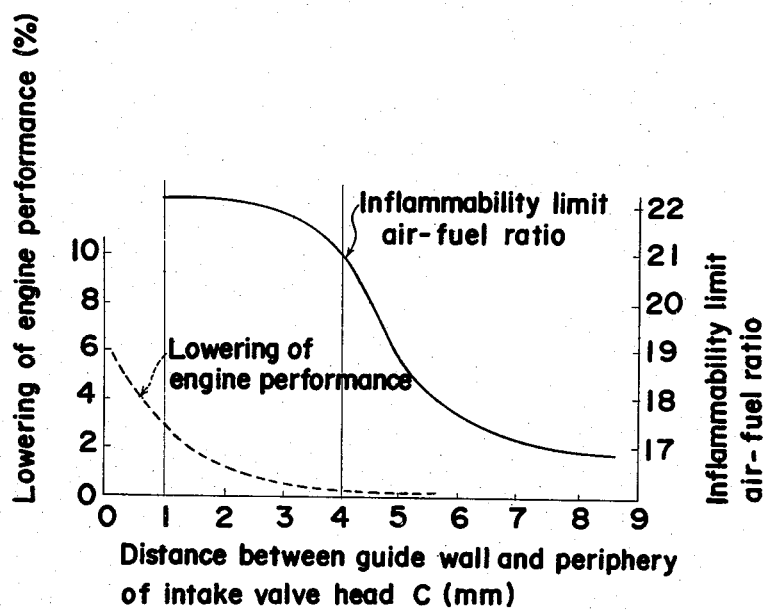
FIG. 9 is a graph showing the influence of the distance between the guide wall and the periphery of the hea of the intake valve on the inflammability limit air-fuel ratio and the reduction of engine performance.

FIG. 9 shows how reduction of engine performance and the lean limit of inflammability of the air-fuel mixture are related to the clearance c when the area and shape of the wall surface 13 are maintained constant. It is seen that the percentage reduction of performance is a maximum when the clearance c is zero and initially decreases sharply as the clearance c is increased from zero, an acceptable level of reduction, which is an the order of 3%, being achieved when the clearance c is greater than 1 mm, and insignificant further decrease in reduction of performance occurring as the clearance c is increased beyond 4 mm. On the other hand, when the clearance c is in the range of from 0 to 4 mm, the wall surface 13 is highly effective in producing swirl in the air-fuel mixture in the combustion chamber, and the lean side inflammability limit of the employable air-fuel mixture is correspondingly high, an air-fuel ratio of as high as 21 being possible when the clearance c is 4 mm. As the clearance c is increased beyond 4 mm, however, the curve of the lean side inflammability drops sharply to a low level. From the above considerations, therefore, the preferred range of values of the clearance c is 1–4 mm. An optimum value of the clearance c is on the order of 1.5 mm, as may be seen from FIG. 9.

Referring back to FIG. 8, the clearance g between the guide wall 12 and the outer periphery of the valve seat 8 also is important in that variations of the clearance g have a considerable influence on mounting of the valve seat 8, service life of the valve seat 8 and intake valve 9, and also on emission of hydrocarbons. In order to make suitable allowance for sinking of the valve 9 due to wear of the valve seat 8, it is normally necessary to make the lower limit of the clearance 11 between the outer periphery of the seat portion 8a of the valve seat 8 and the outer periphery of the valve head 9a at least 0.2 mm, while in consideration of the heating of the valve seat 8 and the intake valve 9 by the gases of combustion and in order to suppress emission of hydrocarbons, it is necessary to keep the upper limit of the clearance 11 to 2 mm or less. In other words, the clearance 11 should be in the range of from 0.2 mm to 2 mm. For similar reasons, the lower limit of the clearance 12 between the outer periphery of the valve seat 8 and the outer periphery of the seat portion 8a of the valve seat 8 must be made at least 0.2 mm and the upper limit thereof must be 3 mm or less, i.e., the clearance 12 is in the range of 0.2 mm–3 mm. As the abovementioned clearance g between the outer periphery of the valve seat 8 and the guide wall 12 is equal to $(c+l1)-l2$, substituting the abovenoted values 1 mm$<c<$4 mm, 0.2 mm$<l1<$2 mm, 0.2$<l2<$3 mm, one obtains as the upper limit for the clearance g, the value 5.8 mm. The lower limit of the clearance g is 0, but since a clearance of at least 0.2 mm is required for mounting the valve seat 8, the preferred range of values of the clearance g is from 0.2 mm to 5.8 mm.

Figure 10:
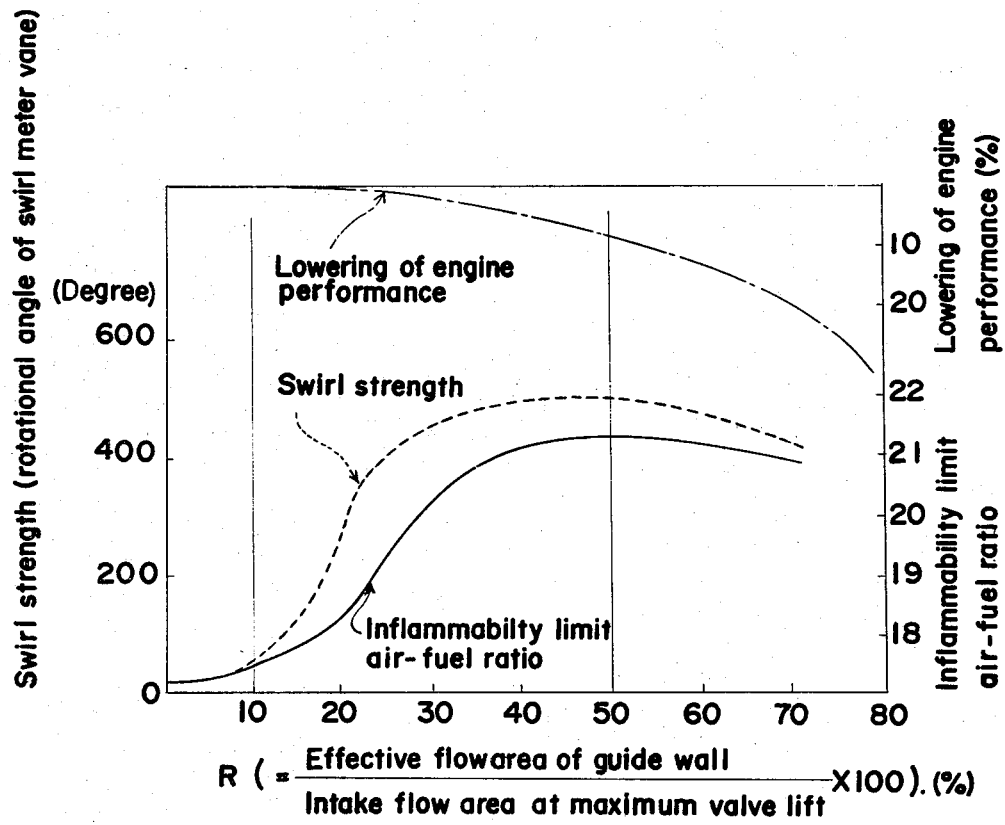
FIG. 10 is a graph showing the relation of swirl strength, the inflammability limit air-fuel ratio, and the reduction of engine performance to effective flow area of an intake valve.

Another factor which is important with respect to the influence of the guide wall 12 on swirling and engine performance is the area of the wall surface 13 thereof relative to area of other portions of the cylinder head, particularly relative to the flow area of the intake valve. To determine the effect on swirl strength and reduction of engine performance, tests were conducted employing cylinder heads having different ratios of guide wall effective surface area, to flow area through the intake port 4 at maximum lift of the intake valve 9, effective area of the guide wall 12 being taken to be the area of the wall surface 13, since other portions of the guide wall 12 have comparatively little influence in determining swirl, and flow area being taken for simplicity to be the area of the frustum of the cone the surface of which is defined by a plane coinciding with the line of slant height indicated by s in FIG. 3. Results of the tests are shown in FIG. 10 to which reference is now had, and from which it is seen that when the ratio R of the guide wall effective area to intake flow area at maximum valve lift, expressed as a percentage, is less than 10%, the guide wall 12 causes no reduction of engine performance, but on the other hand, very little swirl is imparted to the incoming air-fuel mixture, and the lean side inflammability limit of the airfuel mixture is accordingly very low. Once the ratio R exceeds 10%, swirl strength increases rapidly up to a maximum value and there is only a small percentage reduction of engine performance up to a value of 50% for the ratio R. For values of the ratio R greater than 50%, however, there is no further improvement, and there is even a reduction, in swirl strength and the lean side limit, and performance falls rapidly. The ratio R should therefore be kept in the range 10%–50%, and is preferably in the range 20%–40%.

Thus, the invention provides a cylinder head construction in which sufficient swirl is imparted to the airfuel mixture in a combustion chamber making possible the use of lean air-fuel mixtures and reduction of emission of harmful substances, but at the same time problems of misfiring are overcome with only minimum reduction of engine performance.

Although the present invention has been fully described by way of examples with reference to the attached drawings, it is to be noted that various changes and modifications will be apparent to those skilled in the art. Therefore, unless otherwise, such changes and modifications depart from the scope of the present invention, they should be construed as being included therein.

What is claimed is:

1. A cylinder head construction comprising:
    a mating surface for connection to a cylinder block;
    an inner surface having a large-radius of curvature wall portion and a small-radius of curvature wall portion and defining a multi-hemispheric combustion chamber, said large-radius of curvature wall portion having an intake port through which an air-fuel mixture enters said combustion chamber, and said small-radius of curvature wall portion having an exhaust port through which gases produced by combustion of said mixture leave said combustion chamber;
    ignition means in said cylinder head for igniting said mixture in said combustion chamber;
    an intake valve in said intake port actuable to selectively open and close said intake port and an exhaust valve in said exhaust port actuable to selectively open and close said exhaust port, said intake port and exhaust port having therein valve seats on which said intake valve and exhaust valve are seated; and
    guide wall means extending from said inner surface of said cylinder head towards said mating surface and having a first wall surface which faces said intake port and is generally cylindrical around the central axis of said intake port, a second wall surface which faces said exhaust port and curving outwardly from said exhaust port and which is generally smoothly connected with said small-radius of curvature wall portion of said inner surface and extending toward said mating surface in a downward slope to form a junction with a portion of said first wall surface, and a third wall surface which is at the level of said mating surface, said junction being a smooth continuation of the line of junction of said large-radius and small-radius of curvature wall portions, said first wall surface being radially spaced from the outer periphery of said intake valve a distance of from 1 to 4 mm, and having a height in a direction parallel to a line along which said intake valve moves which is greater than the maximum lift of said intake valve, and the downward slope of said junction defining a width of said first wall surface in a direction normal to said line and along said outer periphery of said intake valve which gradually decreases in the direction of movement of said intake valve as it opens said intake port.

2. A cylinder head construction as claimed in claim 1, wherein said second wall surface has a radius of curvature substantially equal to said small radius of curvature wall portion.

3. A cylinder head construction as claimed in claim 1, wherein the distance between the peripheral portion of said intake port valve seat and said first wall surface is in the range of 0.2 mm to 5.8 mm.

4. A cylinder head construction as claimed in claim 1, wherein the radius of the area of said first wall surface to the effective flow area of said intake port at maximum lift of said intake valve is greater than 0.1 and less than 0.5.

* * * * *